(12) United States Patent
Okamoto et al.

(10) Patent No.: US 6,512,079 B2
(45) Date of Patent: Jan. 28, 2003

(54) LIQUID CRYSTALLINE POLYESTER AND METHOD FOR PRODUCING THE SAME

(75) Inventors: Satoshi Okamoto, Tsukuba (JP); Manabu Hirakawa, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/938,621

(22) Filed: Aug. 27, 2001

(65) Prior Publication Data

US 2002/0055607 A1 May 9, 2002

(30) Foreign Application Priority Data

Aug. 29, 2000 (JP) ......................................... 2000-259092

(51) Int. Cl.[7] ................................................ C08G 63/02
(52) U.S. Cl. ...................... 528/272; 528/176; 528/190; 528/193; 528/271
(58) Field of Search .................................. 528/176, 271, 528/272, 190, 193

(56) References Cited

U.S. PATENT DOCUMENTS

| | | | |
|---|---|---|---|
| 4,889,911 A | 12/1989 | Pielartzik et al. | |
| 5,030,703 A | 7/1991 | Pielartzik et al. | |
| 5,747,175 A | 5/1998 | Dietz et al. | |

FOREIGN PATENT DOCUMENTS

| | | |
|---|---|---|
| EP | 0 413 375 A1 | 2/1991 |
| JP | 3-64320 | 3/1991 |
| JP | 6-1836 | 1/1994 |
| JP | 10-310638 | 11/1998 |
| JP | 11-246654 | 9/1999 |

*Primary Examiner*—Terressa M. Boykin
(74) *Attorney, Agent, or Firm*—Birch, Stewart, Kolasch & Birch, LLP

(57) ABSTRACT

A method for producing a liquid crystalline polyester comprising the steps of acylating phenolic hydroxyl groups of an aromatic diol, an aromatic hydroxycarboxylic acid, or an aromatic diol and aromatichydroxycarboxylic acid with a fatty anhydride to obtain an acylated substance, and trans-esterifying said acylated substance with an aromatic dicarboxylic acid, an aromatic hydroxycarboxylic acid, or an aromatic dicarboxylic acid and aromatic hydroxycarboxylic acid, wherein the acylation, the trans-esterification, or the acylation and trans-esterification is conducted in the presence of a heterocyclic organic base compound containing two or more nitrogen atoms.

5 Claims, No Drawings

LIQUID CRYSTALLINE POLYESTER AND METHOD FOR PRODUCING THE SAME

FIELD OF THE INVENTION

The present invention relates to a liquid crystalline polyester and a method of producing the same.

BACKGROUND OF THE INVENTION

Liquid crystalline polyesters having an aromatic ring skeleton are used recently in electric and electronic fields as materials excellent in heat resistance and tensile strength. Liquid crystalline polyesters are produced, for example, by a method of adding acetic anhydride to phenolic hydroxyl groups of an aromatic hydroxycarboxylic acid such as p-hydroxybenzoic acid and the like and/or an aromatic diol such as 4,4'-dihydroxybiphenyl and the like for acylation of the phenolic hydroxyl groups to give an acylated substance and trans-esterifying the acylated substance with an aromatic dicarboxylic acid such as terephthalic acid and the like, and other methods.

However, in this method, time required for acylation is long, leading to a problem in productivity, and there is further a problem that a liquid crystalline polyester having an aromatic skeleton obtained by this method has not necessarily sufficient impact strength though it has excellent heat resistance and tensile strength.

For solving such problems, there is known a method in which an organometal compound such as sodium acetate and the like is added as a catalyst in an acylation reaction to decrease the reaction time (JP-A No. 11-246654). However, this method has a problem that a metal ion remains in a resin, leading to poor insulation ability, and there is further a problem that a liquid crystalline polyester having an aromatic skeleton obtained by this method has not necessarily sufficient impact strength.

Further, there is also known a method in which an organic compound having low boiling point such as pyridine and the like is added as a catalyst in an acylation reaction to decrease the reaction time (JP-A No. 6-1836). However, this method has problems that time for trans-esterification is delayed and coloration owing to a side-reaction occurs and there is further a problem that a liquid crystalline polyester having an aromatic skeleton obtained by this method has not necessarily sufficient impact strength.

SUMMARY OF THE INVENTION

An object of the present invention is to provide a liquid crystalline polyester manifesting excellent impact strength without deteriorating excellent heat resistance and tensile strength, and a method for producing a liquid crystalline polyester having excellent productivity and causing no coloration.

The present inventors have intensively studied a liquid crystalline polyester which does not have the above-described problems, and resultantly found that a liquid crystalline polyester obtained by conducting acylation, trans-esterification, or the acylation and trans-esterification in the presence of a heterocyclic organic base compound containing two or more nitrogen atoms, manifests excellent impact strength while maintaining excellent heat resistance and tensile strength, and also that a liquid crystalline polyester can be produced efficiently without causing coloration due to a side reaction by conducting acylation, trans-esterification, or acylation and trans-esterification in the presence of a heterocyclic organic base compound containing two or more nitrogen atoms, and have completed the present invention.

Namely, the present invention provides

[1] a method for producing a liquid crystalline polyester comprising the steps of acylating phenolic hydroxyl groups of an aromatic diol, an aromatic hydroxycarboxylic acid, or an aromatic diol and aromatic hydroxycarboxylic acid with a fatty anhydride to obtain an acylated substance, and trans-esterifying said acylated substance with an aromatic dicarboxylic acid, an aromatic hydroxycarboxylic acid, or an aromatic dicarboxylic acid and aromatic hydroxycarboxylic acid, wherein the acylation, the trans-esterification, or the acylation and trans-esterification is conducted in the presence of a heterocyclic organic base compound containing two or more nitrogen atoms, and

[2] a liquid crystalline polyester obtained by the method [1].

DETAILED DESCRIPTION OF THE PREFERRED EMBODIMENTS

The liquid crystalline polyester of the present invention has an aromatic ring skeleton which forms a melted phase having optical anisotropy, is excellent in heat resistance and tensile strength, further, excellent also in impact strength.

The liquid crystalline polyester of the present invention can be obtained by polycondensation by trans-esterifying an aromatic dicarboxylic acid and/or an aromatic hydroxycarboxylic acid with an acylated substance obtained by acylating phenolic hydroxyl groups of an aromatic diol and/or an aromatic hydroxycarboxylic acid with a fatty anhydride, and is characterized in that it is obtained by conducting acylation, trans-esterification, or acylation and trans-esterification in the presence of a heterocyclic organic base compound containing two or more nitrogen atoms.

First, a process in which phenolic hydroxyl groups of an aromatic diol and/or an aromatic hydroxycarboxylic acid are acylated with a fatty anhydride will be described.

Examples of the aromatic diol include 4,4'-dihydroxybiphenyl (hereinafter, abbreviated as (C1) in some cases), hydroquinone (hereinafter, abbreviated as (C2) in some cases), resorcin (hereinafter, abbreviated as (C3) in some cases), methylhydroquinone, chlorohydroquinone, acetoxyhydroquinone, nitrohydroquinone, 1,4-dihydroxynaphthalene, 1,5-dihydroxynaphthalene, 1,6-dihydroxynaphthalene, 2,6-dihydroxynaphthalene (hereinafter, abbreviated as (C4) in some cases), 2,7-dihydroxynaphthalene, 2,2-bis(4-hydroxyphenyl)propane (hereinafter, abbreviated as (C5) in some cases), 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis-(4-hydroxyphenyl)methane, bis-(4-hydroxy-3,5-dimethylphenyl)methane, bis-(4-hydroxy-3,5-dichlorophenyl)methane, bis-(4-hydroxy-3,5-dibromophenyl)methane, bis-(4-hydroxy-3-methylphenyl)methane, bis-(4-hydroxy-3-chlorophenyl)methane, 1,1-bis(4-hydroxyphenyl)cyclohexane,bis-(4-hydroxyphenyl)ketone,bis-(4-hydroxy-3,5-dimethylphenyl)ketone, bis-(4-hydroxy-3,5-dichlorophenyl)ketone, bis-(4-hydroxyphenyl)sulfide,bis-(4-hydroxyphenyl) sulfone (hereinafter, abbreviated as (C6) in some cases) and the like. These may be used singly or in combination of two or more.

Among them, 4,4'-dihydroxybiphenyl, hydroquinone, resorcin, 2,6-dihydroxynaphthalene, 2,2-bis(4-hydroxyphenyl)propane and bis-(4-hydroxyphenyl) sulfone are preferably used because of easy availability.

Examples of the aromatic hydroxycarboxylic acid include p-hydroxybenzoic acid (hereinafter, abbreviated as (A1) in some cases), m-hydroxybenzoic acid, 2-hydroxy-6-naphthoic acid (hereinafter, abbreviated as (A2) in some cases), 2-hydroxy-3-naphthoic acid,1-hydroxy-4-naphthoic acid, 4-hydroxy-4'-carboxydiphenyl ether, 2,6-dichloro-p-hydroxybenzoic acid, 2-chloro-p-hydroxybenzoic acid, 2,6-difluoro-p-hydroxybenzoic acid, 4-hydroxy-4'-biphenylcarboxylic acid and the like. These may be used alone or in combination of two or more. Of them, p-hydroxybenzoic acid and 2-hydroxy-6-naphthoic acid are preferably used because of easy availability.

Examples of the fatty anhydride include, but are not limited to, acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride, and the like. These may be used in admixture of two or more. Acetic anhydride, propionic anhydride, butyric anhydride and isobutyric anhydride are preferably used from the standpoint of cost and handling property, and acetic anhydride is more preferably used.

The use amount of a fatty anhydride based on a phenolic hydroxyl group of an aromatic diol and/or an aromatic hydroxycarboxylic acid is preferably 1.0 to 1.2-fold equivalent.

The use amount is more preferably from 1.0 to 1.05-fold equivalent, further preferably from 1.03 to 1.05-fold equivalent from the standpoints of low out gas generation and solder blister-resistance and the like.

The use amount is preferably from 1.05 to 1.1-fold equivalent from the standpoint of impact strength.

When the use amount of a fatty anhydride is less than 1.0-fold equivalent based on the phenolic hydroxyl group, there is a tendency that equilibrium in an acylation reaction shifts to the fatty anhydride side and an unreacted aromatic diol or aromatic dicarboxylic acid is sublimated in polymerization into a polyester, causing clogging of the reaction system. Further, when over 1.2-fold equivalent, the resultant liquid crystalline polyester tends to be colored remarkably.

The acylation reaction is preferably conducted for 10 minutes to 30 hours at 130° C. to 180° C., and more preferably conducted for 20 minutes to 5 hours at 140° C. to 160° C.

Next, trans-esterification of an acylated substance with an aromatic dicarboxylic acid and/or an aromatic hydroxycarboxylic acid is described.

Examples of the aromatic dicarboxylic acid used in trans-esterification include terephthalic acid (hereinafter, abbreviated as (B1) in some cases), isophthalic acid (hereinafter, abbreviated as (B2) in some cases), 2,6-naphthalenedicarboxylic acid (hereinafter, abbreviated as (B3) in some cases), 1,5-naphthalenedicarboxylic acid, 4,4'-biphenyldicarboxylic acid, methylterephthalic acid, methylisophthalic acid, diphenyl ether-4,4'-dicarboxylic acid, diphenylsulfone-4,4'-dicarboxylic acid, diphenyl ketone-4,4'-dicarboxylic acid, 2,2'-diphenylpropane-4,4'-dicarboxylic acid and the like. These may be used alone or in combination of two or more. Of them, terephthalic acid, isophthalic acid and 2,6-naphthalenedicarboxylic acid are preferably used because of easy availability.

As the aromatic hydroxycarboxylic acid used in trans-esterification, those as described above are listed.

The use amount of an aromatic dicarboxylic acid and/or an aromatic hydroxycarboxylic acid based on an acylated substance obtained by acylation of an aromatic diol and/or an aromatic hydroxycarboxylic acid with a fatty anhydride is preferably from 0.8 to 1.2-fold equivalent.

The trans-esterification (polycondensation) reaction is preferably conducted while raising the temperature at a rate of 0.1 to 50° C./min. in the range from 130° .C to 400° C., and more preferably conducted while raising the temperature at a rate of 0.3 to 5° C./min. in the range from 150° C. to 350° C.

In trans-esterifying an acylated fatty ester with a carboxylic acid, it is preferable to evaporate a by-produced fatty acid and an unreacted fatty anhydride, out of the system, for shifting the equilibrium.

Further, raw materials evaporating or sublimating with a fatty acid can be condensed or reverse-sublimated to be returned to a reactor by refluxing part of a fatty acid to be distilled and returning it to a reactor. In this case, they can be returned to a reactor together with a fatty acid even if they are not dissolved completely.

It is necessary to conduct acylation, trans-esterification, or acylation and trans-esterification in the presence of a heterocyclic organic base compound containing two or more nitrogen atoms.

Examples of the heterocyclic organic base compound containing two or more nitrogen atoms include an imidazole compound, triazole compound, dipyridilyl compound, phenanethroline compound, diazaphenanethrene compound, 1.5-diazabicyclo [4.3.0] non-5-ene, 1,4-diazabicyclo [2.2.2] octane, 1,8-diazabicyclo [5.4.0] unde-7-cene, N,N-dimethylaminopyridine and the like.

As the imidazole compound, imidazole compounds of the formula (I) are listed, for example.

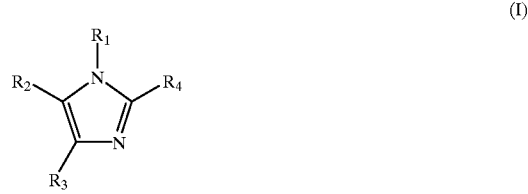

(I)

(wherein, $R_1$ to $R_4$ each independently represent a hydrogen atom, alkyl group having 1 to 4 carbon atoms, hydroxymethyl group, cyano group, cyanoalkyl group having 1 to 4 carbon atoms, cyanoalkoxy group having 1 to 4 carbon atoms, carboxyl group, amino group, aminoalkyl group having 1 to 4 carbon atoms, aminoalkoxy group having 1 to 4 carbon atoms, phenyl group, benzyl group, phenylpropyl group or formyl group.).

Examples of the imidazole compound include imidazole, 1-methylimidazole, 2-methylimidazole, 4-methylimidazole, 1-ethylimidazole, 2-ethylimidazole, 4-ethylimidazole, 1,2-dimethylimidazole, 1,4-dimethylimidazole, 2,4-dimethylimidazole, 1-methyl-2-ethylimidazole, 1-methyl-4-ethylimidazole, 1-ethyl-2-methylimidazole, 1-ethyl-2-ethylimidazole, 1-ethyl-2-phenylimidazole, 2-ethyl-4-methylimidazole, 2-phenylimidazole, 2-undecylimidazole, 2-heptadecylimidazole, 1-benzyl-2-methylimidazole, 2-phenyl-4-methylimidazole, 1-cyanoethyl-2-methylimidazole, 1-cyanoethyl-2-phenylimidazole, 4-cyanoethyl-2-ethyl-4-methylimidazole, 1-aminoethyl-2-methylimidazole, 1-(cyanoethylaminoethyl)-2-methylimidazole, N-[2-(2-methyl-1-imidazolyl)ethyl]urea, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecylimidazole trimellitate, 2,4-diamino-6-[2'-methylimidazolyl-(1')]-ethyl-S-triazine, 2,4-diamino-6-[2'-undecylimidazolyl(-(1'))-ethyl-S-triazin e], 2,4-diamino-6-[2-ethyl-4-methylimidazolyl-(1')]-ethyl-S-tr iazine, 1-dodecyl-2-methyl-3-benzylimidazolium chloride, N,N'-bis(2-methyl-1-imidazolylethyl) urea, N,N'-(2-methyl-1-imidazolylethyl)adipoamide, 2,4-dialkylimidazole-dithiocarboxylic acid, 1,3-benzyl-2-methylimidazolium chloride, 2-phenyl-4-methyl-5-hydroxymethylimidazole, 2-phenyl-4,5-dihydroxymethylimidazole, 1-cyanoethyl-2-phenyl-4,5-bis(cyanoethoxymethyl)imidazole, 2-methylimidazole.isocyanuric acid adduct, 2-phenylimidazole.isocyanuric acid adduct, 2,4-diamino-6-[2'-methylimidazolyl-(1')]-ethyl-S-triazine .isocyanuric acid adduct, 2-alkyl-4-formylimidazole, 2,4-dialkyl-5-formylimidazole, 1-benzyl-2-phenylimidazole, imidazole-4-dithiocarboxylic acid, 2-methylimidazole-4-dithiocarboxylic acid, 2-undecylimidazole-4-dithiocarboxylic acid, 2-heptadecylimidazole-4-dithiocarboxylic acid, 2-phenylimidazole-4-dithiocarboxylic acid, 4-methylimidazole-5-dithiocarboxylic acid, 4-dimethylimidazole -5-dithiocarboxylic acid, 2-ethyl-4-methylimidazole-5-dithiocarboxylic acid, 2-undecyl-4-methylimidazole-5-dithiocarboxylic acid, 2-phenyl-4-methylimidazole-5-dithiocarboxylic acid, 1-aminoethyl-2-methylimidazole, 1-(cyanoethylaminoethyl)-2-methylimidazole, N-(2-methylimidazolyl-1-ethyl) urea, N,N'-[2-methylimidazolyl (1)-ethyl]-adipoyldamide, 1-aminoethyl-2-ethylimidazole, 4-formylimidazole, 2-methyl-4-formylimidazole, 4-methyl-5-formylimidazole, 2-ethyl-4-methyl-5-formylimidazole, 2-phenyl-4-methyl-4-formylimidazole and the like.

As the triazole compound, for example, 1,2,4-triazole, 1,2,3-triazole, benzotriazole and the like are listed.

As the dipyridilyl compound, for example, 2,2'-dipyridilyl, 4,4'-dipyridilyl and the like are listed.

As the phenanethroline compound, for example, pyrimidine, purine, 1,7-phenanathroline, 1,10-phenanethroline and the like are listed.

As the diazaphenanethrene compound, for example, pyridazine, triazine, pyrazine, 1,8-diazaphenanethrene and the like are listed.

As the heterocyclic organic base compound containing two or more nitrogen atoms, imidazole compounds of the formula (I) are preferable from the standpoint of reactivity, and imidazole compounds of the formula (I) in which $R_1$ represents an alkyl group having 1 to 4 carbon atoms and $R_2$ to $R_4$ represent a hydrogen atom are further preferable from the standpoint of hue, and 1-methylimidazole and 1-ethylimidazole are most preferable because of easy availability.

The addition amount of the heterocyclic organic base compound containing two or more nitrogen atoms based on 100 parts by weight of the total amount of an aromatic dicarboxylic acid, aromatic diol and aromatic hydroxycarboxylic acid used in raw material charging is preferably from 0.005 to 1 part by weight, and more preferably from 0.05 to 0.5 parts by weight from the standpoints of hue and productivity.

When the addition amount is less than 0.05 parts by weight, an effect of improving impact strength and the like tends to be small, and when over 1 part by weight, control of the reaction tends to be difficult.

It may be advantageous that the heterocyclic organic base compound containing two or more nitrogen atoms is present during one period in conducting acylation, trans-esterification, or acylation and trans-esterification, and the addition period is not particularly restricted, and may be directly before initiation of the reaction or during the reaction.

In particular, the shrinkage ratio of a molded article when molded can be reduced by adding a heterocyclic organic base compound containing two or more nitrogen atoms at 300° C. or more in the trans-esterification.

For the purpose of increasing polymerization speed by accelerating a trans-esterification reaction, a small amount of catalyst may be added in an amount which does not lose the object of the present invention, if necessary. As the catalyst added, for example, germanium compounds such as germanium oxide and the like, tin compounds such as stannous oxalate, stannous acetate, dialkyltine oxide, diaryltin oxide and the like, titanium compounds such as titanium dioxide, titanium alkoxide, alkoxy titanium silicates and the like, antimony compounds such as antimony trioxide and the like, metal salts of organic acids such as sodium acetate, potassium acetate, calcium acetate, zinc acetate, ferrous acetate and the like, Lewis acids such as boron trifluoride, aluminum chloride and the like, amines, amides, inorganic acids such as hydrochloric acid, sulfuric acid and the like.

The acylation reaction and trans-esterification (polycondensation) reaction can be conducted, for example, using a batch-wise apparatus, continuous apparatus and the like.

The liquid crystalline polyester of the present invention obtained by the above-mentioned production method preferably contains repeating units of the following formula in an amount of at least 30 mol % from the standpoint of balance between heat resistance and impact resistance.

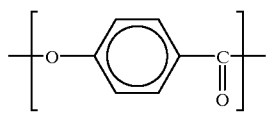

As the liquid crystalline polyester of the present invention obtained by the above-mentioned production method, those having the following repeating structural units (a) to (f) are listed, for example.

(a): A combination of structural units based on the above-mentioned (A1) with structural units based on the above-mentioned (B2), or structural units based on a mixture of the above-mentioned (B1) and (B2) with structural units based on the above-mentioned (C3).

(b): A combination of (a) in which part or all of structural units based on the above-mentioned (C3) are substituted by structural units based on the above-mentioned (C1).

(c): A combination of (a) in which part or all of structural units based on the above-mentioned (C3) are substituted by structural units based on the above-mentioned (C2).

(d): A combination of (a) in which part or all of structural units based on the above-mentioned (C3) are substituted by structural units based on the above-mentioned (C4).

(e): A combination of (a) in which part or all of structural units based on the above-mentioned (C3) are substituted by structural units based on a mixture of the above-mentioned (C4) and (C5).

(f): A combination of (a) in which part or all of structural units based on the above-mentioned (A1) are substituted by structural units based on the above-mentioned (A2).

The weight-average molecular weight of the liquid crystalline polyester is preferably from 10000 to 50000, though it is not particularly restricted.

The liquid crystalline polyester of the present invention is excellent in heat resistance and tensile strength, further, excellent also in impact strength, therefore, it can be suitably used in highly heat-resistant materials typically including electric and electronic parts.

EXAMPLES

It is needless to say that the following examples illustrate the present invention, but do not restrict the scope of the invention.

The properties of resins such as tensile strength, impact strength, deflection temperature under load, bending strength, shrinkage ratio of a molded article, and the like, were measured by the following methods.

(1) Tensile Strength

It was measured according to ASTM D638 using ASTM No. 4 dumbbell.

(2) Impact Strength

It was measured according to ASTM D256 using a specimen (no notch) of 6.4×12.7×64.

(3) Deflection Temperature Under Load

It was measured under a load of 18.6 kg/cm$^2$ according to ASTM D648 using a specimen having a length of 127 mm, a width of 12.7 mm and a thickness of 6.4 mm.

(4) It was measured according to ASTM-D790 at 13 mm (width) ×64 mm (length)×3 mm (thickness), and a bending span distance of 40 mm.

(5) A molded article was produced at 64 mm (width)×64 mm (length)×3 mm (thickness), and a film gate of 1 mm (thickness), and shrinkage ratios along the flow direction of molecules (MD) and direction vertical to it (TD) at 23° C. were measured.

(6) Liquid Chromatography (LC) Analysis

Conditions for LC analysis (are percentage) are as follows.

Sample solution: 30 mg of a sample was collected, and dissolved in 10 ml of N-methylpyrrolidone.

Apparatus: Waters 600 E (manufactured by Waters)

Detector: Waters 484 (manufactured by Waters)

Column: ODS-AM AM-312

(5 μm, 6 mm ϕ×15 cm)

Column temperature: 40° C.

Moving bed: Liquid A methanol (containing 2.5 vol % of acetic acid)

Liquid B water (containing 2.5 vol % of acetic acid)

Gradient method: Liquid B=60% →(25 min.)→100% (maintained for 20 min.)

Flow rate: 1.0 ml/min.

Detection wavelength: UV254 nm

Injection amount 2 μm (7) Solder Blister Resistance

JIS K71131 No.(½) dumbbell×1.2 mmt was immersed in H60A solder (tin 60%, lead 40%) of given temperature for 60 seconds, and temperature at which foaming (blister) was found in a molded article was measured.

(8) Amount of Generated Gas 5 g of JIS K71131 No. (½) dumbbell×0.8 mmt was weighed in a glass bottle, the bottle was sealed, then, heated at 120° C. for 20 hours, and the total amount of a gas generated was measured by a head space gas chromatograph (GC15A/HSS3A, manufactured by Shimadzu Corp.).

Example 1

Into a reaction vessel equipped with a stirrer, torque meter, nitrogen gas introducing tube, thermometer and reflux condenser was charged 1064 g (7.7 mol) of p-hydroxybenzoic acid, 307 g (1.65 mol) of 4,4'-dihydroxybiphenyl, 274.1 g (1.65 mol) of terephthalic acid and 1235 g (12.1 mol) of acetic anhydride. The reaction vessel was charged sufficiently with a nitrogen gas, then, heated up to 150° C. over 15 minutes under nitrogen gas flow, and the mixture was refluxed for 3 hours while maintaining the temperature.

Subsequently, 1.1 g of 1-methylimidazole was added, then, the mixture was heated up to 320° C. over 2 hours and 50 minutes while distilling off by-product acetic acid distilled and unreacted acetic anhydride, and recognition point of increase in torque was regarded as completion of the reaction, and the content was removed at this point. The resulted solid was cooled to room temperature, ground by a coarse grinder, then, the mixture was heated from room temperature up to 250° C. over 1 hour under nitrogen atmosphere, and heated from 250° C. to 335° C. over 5 hours, and maintained at 335° C. for 3 hours, to progress the polymerization reaction in a solid layer. Crystallinity of the resulted resin was measured by a polarization microscope, to find it was a liquid crystalline polyester which forms a melted phase having optical anisotropy.

Milled glass (REV-8) manufactured by Asahi Glass Co., LTd. was compounded and mixed in an amount of 40 wt % into the resulted resin, and the mixture was granulated at 390° C. using a twin-screw extruder (PCM-30, manufactured by Ikegai Tekko K.K.). The resulted pellets were injection-molded at a cylinder temperature of 400° C. and a mold temperature of 130° C. using an injection molding machine, type PS4OE5ASE manufactured by Nisshin Jushi Kogyo K.K., and the properties of the resin (tensile strength, impact strength, deflection temperature under load) were evaluated.

Examples 2 to 3

Comparative Examples 1 to 3

Resins were obtained and properties thereof were measured in the same manner as in Example 1 except that compounding ratios of raw materials and polymerization temperature in a solid layer shown in Table 1 were changed.

Regarding the resulted resins, crystallinity was measured by a polarization microscope, to find they were liquid crystalline polyesters which form a melted phase having optical anisotropy, like in Example 1.

Example 4

Into a reaction vessel equipped with a stirrer, torque meter, nitrogen gas introducing tube, thermometer and reflux condenser was charged 911 g (6.6 mol) of p-hydroxybenzoic acid, 409 g (2.2 mol) of 4,4'-dihydroxybiphenyl, 274 g (1.65 mol) of terephthalic acid, 91 g (0.55 mol) of isophthalic acid and 1235 g (12.1 mol) of acetic anhydride. The reaction vessel was charged sufficiently with a nitrogen gas, then, heated up to 150° C. over 15 minutes under nitrogen gas flow, and the mixture was refluxed for 3 hours while maintaining the temperature.

Subsequently, 1.1 g of 1-methylimidazole was added, then, the mixture was heated up to 320° C. over 2 hours and 50 minutes while distilling off by-product acetic acid distilled and unreacted acetic anhydride, and recognition point of increase in torque was regarded as completion of the reaction, and the content was removed at this point. The resulted solid was cooled to room temperature, ground by a coarse grinder, then, the mixture was heated from room temperature up to 250° C. over 1 hour under nitrogen atmosphere, and heated from 250° C. to 288° C. over 5 hours, and maintained at 288° C. for 3 hours, to progress the polymerization reaction in a solid layer.

Milled glass (EFH-7501) manufactured by Central Glass was compounded and mixed in an amount of 40 wt % into the resulted resin, and the mixture was granulated at 340° C. using a twin-screw extruder (PCM-30, manufactured by Ikegai Tekko K.K.). The resulted pellets were injection-molded at a cylinder temperature of 350° C. and a mold temperature of 130° C. using an injection molding machine, type PS40E5ASE manufactured by Nisshin Jushi Kogyo K.K., and the properties of the resin (tensile strength, impact strength, deflection temperature under load) were evaluated.

Comparative Example 4

A resin was obtained and properties thereof were measured in the same manner as in Example 2 except that the polymerization temperature in a solid layer shown in Table 1 was changed. The results are shown in Table. 1

Regarding the resulted resin, crystallinity was measured by a polarization microscope, to find it was a liquid crystalline polyester which forms a melted phase having optical anisotropy, like in Example 2.

p-hydroxybenzoic acid, 460.9 g (2.48 mol) of 4,4'-dihydroxybiphenyl, 411.2 g (1.65 mol) of terephthalic acid and 1235 g (12.1 mol) of acetic anhydride. The reaction vessel was charged sufficiently with a nitrogen gas, then, heated up to 150° C. over 15 minutes under nitrogen gas flow, and the mixture was refluxed for 3 hours while maintaining the temperature.

Subsequently, the mixture was heated up to 300° C. over 2 hours and 30 minutes while distilling off by-product acetic acid distilled and unreacted acetic anhydride, and 0.3 g of 1-methylimidazole was added, then, the mixture was further heated up to 320° C. over 20 minutes, and recognition point of increase in torque was regarded as completion of the reaction, and the content was removed at this point. The resulted solid was cooled to room temperature, ground by a coarse grinder, then, the mixture was heated from room temperature up to 250° C. over 1 hour under nitrogen atmosphere, and heated from 250° C. to 330° C. over 5 hours, and maintained at 330° C. for 3 hours, to progress the polymerization reaction in a solid layer.

Milled glass (REV-8) manufactured by Asahi Glass Co., LTd. was compounded and mixed in an amount of 40 wt % into the resulted resin, and the mixture was granulated at 390° C. using a twin-screw extruder (PCM-30, manufactured by Ikegai Tekko K.K.). The resulted pellets were injection-molded at a cylinder temperature of 400° C. and a mold temperature of 130° C. using an injection molding machine, type PS40E5ASE manufactured by Nisshin Jushi Kogyo K.K., and the properties of the resin (bending strength, shrinkage ratio of a molded article) were evaluated. The bending strength was 129 MPa, the shrinkage ratio of the molded article along the flow direction of molecules (MD) was 0%, and the shrinkage ratio of the molded article along the direction vertical to the flow (TD) was 1.1%. The anisotropy (TD-MD) of shrinkage ratio was 1.1%.

TABLE 1

|  |  | Example | | | | Comparative example | | | |
|---|---|---|---|---|---|---|---|---|---|
|  |  | 1 | 2 | 3 | 4 | 1 | 2 | 3 | 4 |
| Charging | PHBA(mol) | 7.7 | 7.7 | 5.5 | 6.6 | 7.7 | 5.5 | 4.95 | 6.6 |
|  | DHB(mol) | 1.65 | 1.65 | 2.75 | 2.2 | 1.65 | 2.75 | 3.025 | 2.2 |
|  | TP(mol) | 1.65 | 1.65 | 2.75 | 1.65 | 1.65 | 2.75 | 3.025 | 1.65 |
|  | IP(mol) |  |  |  | 0.55 |  |  |  | 0.55 |
|  | Acetic anhydride (mol) | 12.1 | 12.1 | 12.1 | 12.1 | 12.1 | 12.1 | 12.1 | 12.1 |
|  | 1 MI(g) | 1.1 | 0.7 | 4.4 | 4.5 | none | none | none | none |
| Polymerization temperature in solid layer (° C.) |  | 335 | 331 | 339 | 288 | 322 | 327 | 327 | 285 |
| Tensile strength (MPa) |  | 134 | 132 | 92 | 133 | 121 | 85 | 76 | 146 |
| Impact strength (J/m) |  | 490 | 490 | 230 | 390 | 250 | 150 | 100 | 290 |
| Deflection temperature under load (° C.) |  | 339 | 340 | 349 | 269 | 345 | 352 | 347 | 279 |

PHBA: p-hydroxybenzoic acid
DHB: 4,4'-dihydroxybiphenyl
TP: terephthalic acid
IP: isophthalic acid
1 MI: 1-methylimidazole Example 5

Into a reaction vessel equipped with a stirrer, torque meter, nitrogen gas introducing tube, thermometer and reflux condenser was charged 835.6 g (6.1 mol) of Comparative Example 5

Into a reaction vessel equipped with a stirrer, torque meter, nitrogen gas introducing tube, thermometer and reflux condenser was charged 835.6 g (6.1 mol) of p-hydroxybenzoic acid, 460.9 g (2.48 mol) of 4,4'-dihydroxybiphenyl, 411.2 g (1.65 mol) of terephthalic acid and 1235 g (12.1 mol) of acetic anhydride. The reaction vessel was charged sufficiently with a nitrogen gas, then, heated up to 150° C. over 15 minutes under nitrogen gas flow, and the mixture was refluxed for 3 hours while maintaining the temperature.

Subsequently, 0.3 g of 1-methylimidazole was added, then, the mixture was heated up to 320° C. over 2 hours and 50 minutes while distilling off by-product acetic acid distilled and unreacted acetic anhydride, and recognition point of increase in torque was regarded as completion of the reaction, and the content was removed at this point. The resulted solid was cooled to room temperature, ground by a coarse grinder, then, the mixture was heated from room temperature up to 250° C. over 1 hour under nitrogen atmosphere, and heated from 250° C. to 330° C. over 5 hours, and maintained at 330° C. for 3 hours, to progress the polymerization reaction in a solid layer.

Milled glass (REV-8) manufactured by Asahi Glass Co., LTd. was compounded and mixed in an amount of 40 wt % into the resulted resin, and the mixture was granulated at 390° C. using a twin-screw extruder (PCM-30, manufactured by Ikegai Tekko K.K.). The resulted pellets were injection-molded at a cylinder temperature of 400° C. and a mold temperature of 130° C. using an injection molding machine, type PS40E5ASE manufactured by Nisshin Jushi Kogyo K.K., and the properties of the resin (bending strength, shrinkage ratio of a molded article) were evaluated. The bending strength was 124 MPa, the shrinkage ratio of the molded article along the flow direction of molecules (MD) was 0.1%, and the shrinkage ratio of the molded article along the direction vertical to the flow (TD) was 1.4%. The anisotropy (TD-MD) of shrinkage ratio was 1.3%.

Example 6

Into a reaction vessel equipped with a stirrer, torque meter, nitrogen gas introducing tube, thermometer and reflux condenser was charged 911 g (6.6 mol) of p-hydroxybenzoic acid, 409 g (2.2 mol) of 4,4'-dihydroxybiphenyl, 274 g (1.65 mol) of terephthalic acid, 91 g (1.65 mol) of isophthalic acid and 1235 g (12.1 mol) of acetic anhydride. The reaction vessel was charged sufficiently with a nitrogen gas, then, 0.14 g of 1-methylimidazole was added, then, the mixture was heated up to 150° C. over 15 minutes under nitrogen gas flow, and the mixture was refluxed for 30 minutes while maintaining the temperature. For monitoring the progress of the acylation reaction, LC analysis was conducted and the acylation reaction ratio was calculated by the content ratio of p-hydroxybenzoic acid to the acylated p-hydroxybenzoic acid. As a result, the reaction ratio was 100%.

Subsequently, the mixture was heated up to 320° C. over 2 hours and 50 minutes while distilling off by-product acetic acid distilled and unreacted acetic anhydride, and recognition point of increase in torque was regarded as completion of the reaction, and the content was removed at this point. The resulted solid was cooled to room temperature, ground by a coarse grinder, then, the mixture was heated from room temperature up to 250° C. over 1 hour under nitrogen atmosphere, and heated from 250° C. to 276° C. over 5 hours, and maintained at 276° C. for 3 hours, to progress the polymerization reaction in a solid layer.

Regarding the resulted resin, crystallinity was measured by a polarization microscope, to find it was a liquid crystalline polyester which forms a melted phase having optical anisotropy.

Example 7

Into a reaction vessel equipped with a stirrer, torque meter, nitrogen gas introducing tube, thermometer and reflux condenser was charged 911 g (6.6 mol) of p-hydroxybenzoic acid, 409 g (2.2 mol) of 4,4'-dihydroxybiphenyl, 274 g (1.65 mol) of terephthalic acid, 91 g (1.65 mol) of isophthalic acid and 1235 g (12.1 mol) of acetic anhydride. The reaction vessel was charged sufficiently with a nitrogen gas, then, 0.29 g of 1-methylimidazole was added, then, the mixture was heated up to 150° C. over 15 minutes under nitrogen gas flow, and the mixture was refluxed for 30 minutes while maintaining the temperature. For monitoring the progress of the acylation reaction, LC analysis was conducted and the acylation reaction ratio was calculated by the content ratio of p-hydroxybenzoic acid to the acylated p-hydroxybenzoic acid. As a result, the reaction ratio was 100%.

Subsequently, the mixture was heated up to 320° C. over 2 hours and 50 minutes while distilling off by-product acetic acid distilled and unreacted acetic anhydride, and recognition point of increase in torque was regarded as completion of the reaction, and the content was removed at this point. The resulted solid was cooled to room temperature, ground by a coarse grinder, then, the mixture was heated from room temperature up to 250° C. over 1 hour under nitrogen atmosphere, and heated from 250° C. to 276° C. over 5 hours, and maintained at 276° C. for 3 hours, to progress the polymerization reaction in a solid layer.

Regarding the resulted resin, crystallinity was measured by a polarization microscope, to find it was a liquid crystalline polyester which forms a melted phase having optical anisotropy.

Comparative Example 6

Into a reaction vessel equipped with a stirrer, torque meter, nitrogen gas introducing tube, thermometer and reflux condenser was charged 911 g (6.6 mol) of p-hydroxybenzoic acid, 409 g (2.2 mol) of 4,4'-dihydroxybiphenyl, 274 g (1.65 mol) of terephthalic acid, 91 g (1.65 mol) of isophthalic acid and 1235 g (12.1 mol) of acetic anhydride. The reaction vessel was charged sufficiently with a nitrogen gas, then, the mixture was heated up to 150° C. over 15 minutes under nitrogen gas flow, and the mixture was refluxed for 30 minutes while maintaining the temperature. For monitoring the progress of the acylation reaction, LC analysis was conducted and the acylation reaction ratio was calculated by the content ratio of p-hydroxybenzoic acid to the acylated p-hydroxybenzoic acid. As a result, the acylation reaction ratio was 93%.

Example 8

Into a reaction vessel equipped with a stirrer, torque meter, nitrogen gas introducing tube, thermometer and reflux condenser was charged 911 g (6.6 mol) of p-hydroxybenzoic acid, 409 g (2.2 mol) of 4,4'-dihydroxybiphenyl, 274 g (1.65 mol) of terephthalic acid, 91 g (0.55 mol) of isophthalic acid and 1123 g (11.55 mol) of acetic anhydride. The reaction vessel was charged sufficiently with a nitrogen gas, then, 0.3 g of 1-methylimidazole was added, then, the mixture was heated up to 150° C. over 15 minutes under nitrogen gas flow, and the mixture was refluxed for 60 minutes while maintaining the temperature.

Subsequently, the mixture was heated up to 320° C. over 2 hours and 50 minutes while distilling off by-product acetic acid distilled and unreacted acetic anhydride, and recognition point of increase in torque was regarded as completion of the reaction, and the content was removed at this point. The resulted solid was cooled to room temperature, ground by a coarse grinder, then, the mixture was heated from room temperature up to 250° C. over 1 hour under nitrogen atmosphere, and heated from 250° C. to 281° C. over 5 hours, and maintained at 281° C. for 3 hours, to progress the polymerization reaction in a solid layer.

Milled glass (EFH-7501) manufactured by Central Glass was compounded and mixed in an amount of 40 wt % into the resulted resin, and the mixture was granulated at 340° C. using a twin-screw extruder (PCM-30, manufactured by Ikegai Tekko K.K.). The resulted pellets were injection-molded at a cylinder temperature of 350° C. and a mold temperature of 130° C. using an injection molding machine, type PS40E5ASE manufactured by Nisshin Jushi Kogyo K.K., and the properties of the resin (solder blister resistance, amount of generated gas) were evaluated. The results are shown in Table 2.

Example 9

The same procedure was conducted as in Example 1 except that 1123 g(11mol)of acetic anhydride was changed. The results are shown in Table 2.

Comparative Example 7

The same procedure was conducted as in Example 2 except that N-methylimidazole was not used. The results are shown in Table 2.

TABLE 2

|  | Example | | Comparative example |
|---|---|---|---|
|  | 8 | 9 | 7 |
| Charging |  |  |  |
| PHBA (mol) | 6.6 | 6.6 | 6.6 |
| DHB (mol) | 2.2 | 2.2 | 2.2 |
| TP (mol) | 1.65 | 1.65 | 1.65 |
| IP (mol) | 0.55 | 0.55 | 0.55 |
| Acetic anhydride (mol) | 11.55 | 11 | 11 |
| 1 MI (g) | 0.3 | 0.3 | 0 |
| Solder blister resistance | 320° C. | 280° C. | 240° C. |
| Amount of generated gas | 4 ppm | 3 ppm | 3 ppm |

PHBA: p-hydroxybenzoic acid
DHB: 4,4'-dihydroxybiphenyl
TP: terephthalic acid
IP: isophthalic acid
1 MI: 1-methylimidazole The liquid crystalline polyester of the present invention manifests particularly excellent impact strength without deteriorating excellent heat resistance and tensile strength, therefore, it is extremely useful as a highly heat-resistant material typically including electric and electronic parts.

Further, according to the present invention, the liquid crystalline polyester can be produced efficiently without causing coloration due to a side reaction.

What is claimed is:

1. A method for producing a liquid crystalline polyester comprising the steps of acylating phenolic hydroxyl groups of an aromatic diol, an aromatic hydroxycarboxylic acid, or an aromatic diol and aromatic hydroxycarboxylic acid with a fatty anhydride to obtain an acylated substance, and trans-esterifying said acylated substance with an aromatic dicarboxylic acid, an aromatic hydroxycarboxylic acid, or an aromatic dicarboxylic acid and aromatic hydroxycarboxylic acid, wherein the acylation, the trans-esterification, or the acylation and trans-esterification is conducted in the presence of a heterocyclic organic base compound containing two or more nitrogen atoms.

2. The method according to claim 1, wherein the heterocyclic organic base compound containing two or more nitrogen atoms is added to the acylated substance to conduct trans-esterification at 300° C. or more.

3. The method according to claim 1, wherein the heterocyclic organic base compound containing two or more nitrogen atoms is an imidazole compound represented by formula (I):

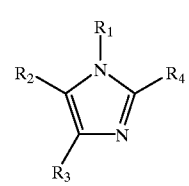

(I)

wherein, $R_1$ to $R_4$ each independently represent a hydrogen atom, alkyl group having 1 to 4 carbon atoms, hydroxymethyl group, cyano group, cyanoalkyl group having 1 to 4 carbon atoms, cyanoalkoxy group having 1 to 4 carbon atoms, carboxyl group, amino group, aminoalkyl group having 1 to 4 carbon atoms, aminoalkoxy group having 1 to 4 carbon atoms, phenyl group, benzyl group, phenylpropyl group or formyl group.

4. The method according to any of claim 1, wherein the aromatic diol is 4,4-dihydroxybiphenyl, the aromatic hydroxycarboxylic acid is p-hydroxybenzoic acid, and the aromatic dicarboxylic acid is terephthalic acid, isophthalic acid, or terephthalic acid and isophthalic acid.

5. A liquid crystalline polyester produced by the method according to claim 1.

* * * * *